(12) United States Patent
Matayoshi et al.

(10) Patent No.: US 7,561,067 B2
(45) Date of Patent: Jul. 14, 2009

(54) AIRSPEED / WIND SPEED MEASUREMENT DEVICE FOR AIRCRAFT, AND DISPLAY DEVICE FOR SAME

(75) Inventors: Naoki Matayoshi, Chofu (JP); Kimio Asaka, Chofu (JP); Yoshinori Okuno, Chofu (JP); Masahiro Hagio, Tokyo (JP); Yoshihito Hirano, Tokyo (JP); Shumpei Kameyama, Tokyo (JP); Toshiyuki Ando, Tokyo (JP); Hidetaka Kiyosue, Tokyo (JP); Masashi Furuta, Tokyo (JP); Tomoya Matsuda, Tokyo (JP)

(73) Assignees: Japan Aerospace Exploration Agency, Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 526 days.

(21) Appl. No.: 11/392,515

(22) Filed: Mar. 30, 2006

(65) Prior Publication Data

US 2007/0236367 A1 Oct. 11, 2007

(51) Int. Cl.
*G08G 5/00* (2006.01)
*G05D 1/00* (2006.01)
*G01C 23/00* (2006.01)
(52) U.S. Cl. .................... 340/973; 340/949; 340/968; 340/969; 701/3; 701/7; 701/14; 73/170.11; 73/178 H; 73/178 R; 342/26 B
(58) Field of Classification Search ......... 340/967–969, 340/973, 949, 978; 701/7, 14; 342/26 B; 73/170.07, 170.11, 178 R, 178 H, 178 T
See application file for complete search history.

(56) References Cited

U.S. PATENT DOCUMENTS 4,506,979 A * 3/1985 Rogers .................... 356/28.5

(Continued)

OTHER PUBLICATIONS

Kimio Asaka et al., "1.5 μm Airborne Coherent Doppler Lidar for CAT sensor—Flight Test Results", 13th Coherent Laser Radar Conference, pp. 153-156.

(Continued)

*Primary Examiner*—Davetta W Goins
*Assistant Examiner*—Anne V Lai
(74) *Attorney, Agent, or Firm*—Westerman, Hattori, Daniels & Adrian, LLP.

(57) ABSTRACT

A measurement system for an aircraft having the three-axis components of the airspeed of the aircraft, the three-axis components of the wind speed currently encountered by the aircraft, and the wind speed distribution ahead of the aircraft simultaneously in real time. It comprises a Doppler anemometer measuring the airflow speeds at a plurality of points separated by a prescribed distance in the beam irradiation direction that changes in a time series, and an inertial data measurement device measuring the movement information and positional information of the aircraft. Moreover, the display system of the aircraft includes the horizontal two-axis airspeed of the aircraft, the three-axis components of the wind speed currently encountered by the aircraft, and information on the wind speed distribution ahead of the aircraft are displayed simultaneously in real time.

12 Claims, 4 Drawing Sheets

U.S. PATENT DOCUMENTS

| | | | | |
|---|---|---|---|---|
| 4,735,503 | A * | 4/1988 | Werner et al. | 356/28.5 |
| 4,761,650 | A * | 8/1988 | Masuda et al. | 342/26 D |
| 5,063,777 | A * | 11/1991 | Arethens et al. | 73/178 H |
| 5,091,871 | A * | 2/1992 | Arethens | 701/14 |
| 5,208,587 | A * | 5/1993 | Cornman | 340/968 |
| 5,214,596 | A * | 5/1993 | Muller | 702/144 |
| 5,546,799 | A * | 8/1996 | Parker | 73/170.11 |
| 5,648,604 | A * | 7/1997 | Morbieu | 73/181 |
| 5,657,009 | A * | 8/1997 | Gordon | 340/968 |
| 5,715,163 | A * | 2/1998 | Bang et al. | 701/202 |
| 5,926,401 | A * | 7/1999 | Montag et al. | 703/5 |
| 6,405,107 | B1 * | 6/2002 | Derman | 701/3 |
| 6,751,532 | B2 * | 6/2004 | Inokuchi | 701/14 |
| 6,970,107 | B2 * | 11/2005 | Gannett | 340/967 |
| 6,985,091 | B2 * | 1/2006 | Price | 340/975 |
| 7,292,178 | B1 * | 11/2007 | Woodell et al. | 342/26 B |

OTHER PUBLICATIONS

Jean-Pierre Cariou et al., "All-fiber 1.5 µm CW coherent laser anemometer DALHEC Helicopter flight test analysis", 13th Coherent Laser Radar Conference, pp. 157-160.

* cited by examiner

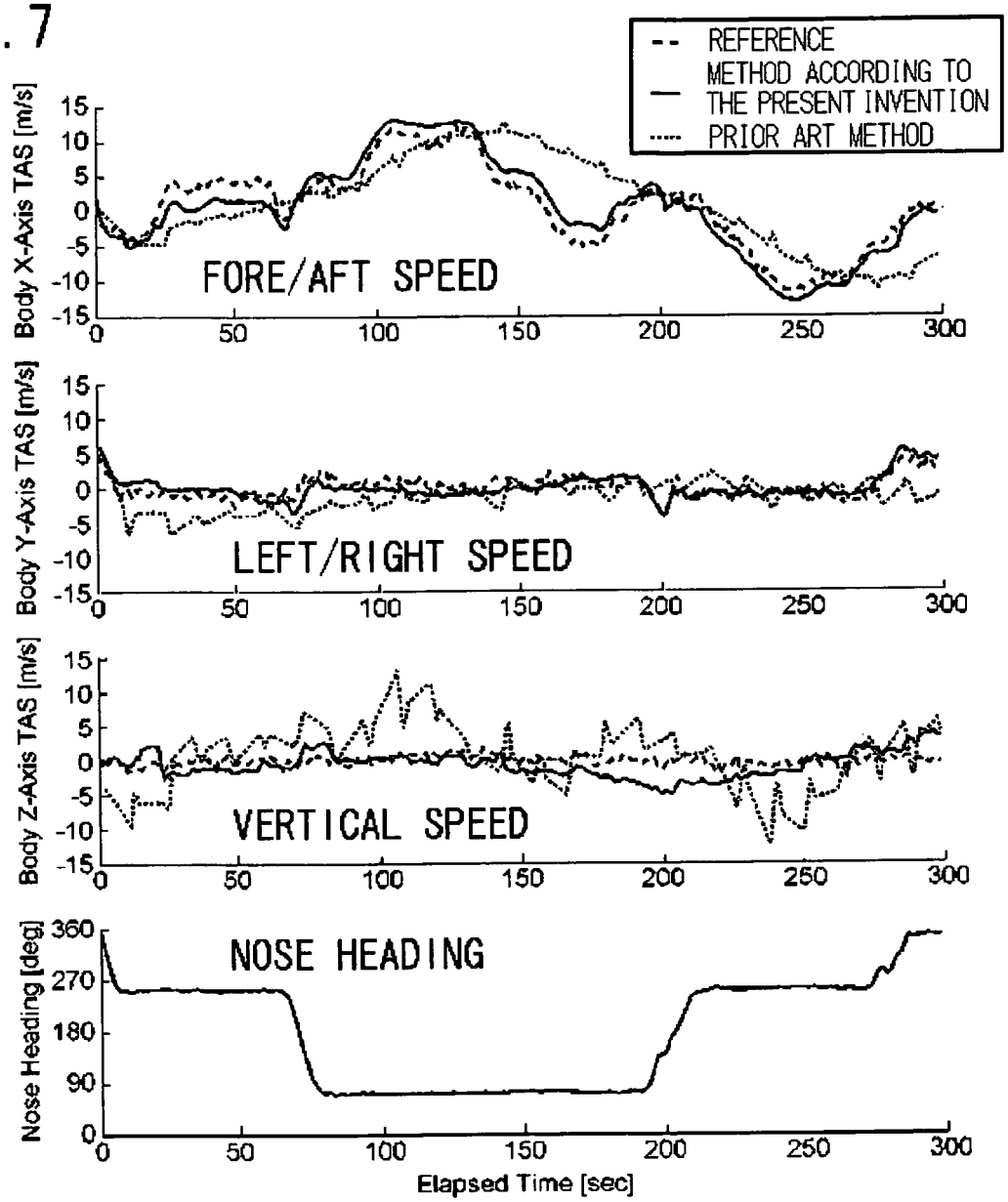

AIRSPEED / WIND SPEED MEASUREMENT DEVICE FOR AIRCRAFT, AND DISPLAY DEVICE FOR SAME

BACKGROUND OF THE INVENTION

1. Field of the Invention

The present invention relates to a system which prevents an aircraft, such as a helicopter, from traveling at a speed exceeding a limit (and in particular, a lateral speed in the rightward or leftward directions, or a rearward speed), as well as assisting in flying the helicopter so as to avoid areas of strong wind turbulence, by simultaneously measuring the three-axis components of the airspeed of the aircraft, and the three-axis components of the wind speed ahead of the aircraft, and displaying or presenting this information to the pilot or the automatic control system controlling the aircraft.

2. Description of the Related Art

In many cases, when a helicopter is stationary in the air (hovering), then although it has a capability for traveling sideways or rearwards, restrictions are placed on the speed of this travel (lateral speed in left or rightward direction, rearward speed) due to the flight characteristics. However, a conventional type of airspeed sensor, based on a Pitôt tube system (pressure measurement sensor), is not capable of measuring lateral speed or rearward speed, and therefore, although the pilot can judge the speed of the aircraft on the basis of the relative movement of the ground terrain, and the handling characteristics of the aircraft, it is difficult to judge the speed in this way in bad weather conditions, or at night time, when the terrain is difficult to see, or when the aircraft is over the sea, where there are few objects that serve as indicators. Hence, there is a danger of going beyond the speed restrictions. Moreover, a helicopter may encounter air disturbances relating to the local topography, for instance, when used to transport goods or perform rescue tasks in mountainous areas, or when landing at or taking off from heliports on high-rise buildings, and in such cases, the capability to present information on the wind speed in front of the helicopter, to the pilot, in advance, would contribute towards increasing safety and improving the probability of completing tasks successfully. In view of these points, there is a need for a system which is capable of measuring the three-axis airspeed including the lateral speed and the rearward speed components, in a helicopter, and measuring the wind speed information in front of the helicopter. Furthermore, it is also necessary to display information relating to the measured airspeed and wind speed, to the pilot, in a readily comprehensible fashion.

One known method for measuring the speed of movement of the atmosphere (wind speed) at a remote point, is a Doppler anemometer. A Doppler anemometer is a device which irradiates a beam of radio waves, light waves (laser) or acoustic waves, into the atmosphere, and determines the remote wind speed from the Doppler shift in the resulting scattered wave. However, the wind speed which can be measured by this device is limited to a one-axis component in the direction of irradiation of the beam. Depending on the type of beam irradiated, Doppler anemometers are classified as radar anemometers (which irradiate radio waves), lidar anemometers (which irradiate laser light), and sodar anemometers (which irradiate sound waves).

In recent years, systems have been manufactured for obtaining wind speed information in front of the aircraft, or the airspeed of the aircraft, by mounting a lidar anemometer in an aircraft. The present applicants have also discovered a system of this kind, and have acquired patent rights for same in Japan and the U.S.A. The invention relating to a "Wind Turbulence Prediction System" in the U.S. Pat. No. 6,751,532 has the object of providing a wind turbulence prediction system which is capable of measuring the three-dimensional wind turbulence and confirming in advance whether or not an issued warning is reliable, and in order to achieve this system, a lidar anemometer is mounted in the aircraft, a laser beam is irradiated while being scanned in a conical shape, and the scattered light scattered by the regions of wind turbulence ahead of the aircraft in flight is received, thereby achieving a method which measures the speed of the remote three-dimensional air flow. Furthermore, in order to account for the effects of vertical winds and fore and aft winds on the aircraft, the measured three-dimensional air flow information is converted into vertical wind only, and displayed in a simplified, two-dimensional fashion, in such a manner that the wind turbulence is represented separately in terms of the strength of the turbulence and the average wind speed. However, the system for measuring the three-axis components of the wind speed ahead of the aircraft by means of a lidar anemometer of this kind does not consider the use of information on the airspeed of the aircraft. Moreover, there is no compensation for the movement of the aircraft during laser beam scanning, and hence there is a problem in that the error becomes large when the aircraft is moving in an unsteady fashion, or moving at high-speed. In addition, the display of the obtained wind speed information is restricted to a display of the wind conditions ahead of the aircraft, with respect to a passenger aircraft which does not vary flight path largely. However, in the case of a helicopter, there may be large vertical or lateral changes in the flight path when traveling at low speed, and therefore, the wind speed information in the vertical and lateral directions is also required, in addition to information on the wind speed in the forward direction of the aircraft.

Furthermore, at the "30$^{th}$ European Rotorcraft Forum" held in Marseilles, France on September 2004, the presentation given by "Thales Avionics" and "ONERA" on "A1.5 μm LIDAR demonstrator of low airspeed measurement for civil helicopter" related to a system for measuring the three-axis components of the airspeed of the helicopter by means of a lidar anemometer, whereby the three-axis components of the airspeed is acquired by irradiating and scanning a laser beam in a conical fashion. However, it does not provide compensation for the movement of the aircraft during scanning, and therefore has large error when the aircraft is performing unsteady movements or traveling at high speed. Moreover, the laser beam is irradiated in an upward lateral direction from the aircraft, and there is a problem in that the wind speed ahead of the aircraft cannot be measured.

These systems are restricted to measurement of the wind speed ahead of the aircraft, and measurement of the airspeed of the aircraft, respectively, and no mention is made of acquiring and displaying these two information elements simultaneously. Furthermore, no compensation is provided in respect of the movement of the aircraft during the travel of the beam of the lidar anemometer, and the error becomes large when the aircraft performs unsteady movement or travels at high speed.

SUMMARY OF THE INVENTION

The object of the present invention is to resolve these problems, by providing a system for an aircraft, such as a helicopter, capable of measuring the three-axis wind speed, including the lateral speed and rearward speed of the aircraft, and measuring the wind speed distribution information ahead of the aircraft, and furthermore, by providing a display system which displays the measured airspeed and wind speed information to the pilot, in a readily comprehensible fashion. Moreover, a compensation function for the movement of the aircraft during the travel of the beam of the Doppler anemometer is also provided, and therefore, highly accurate measurement is achieved.

In the measurement system for an aircraft according to the present invention, the three-axis components of the airspeed of the aircraft, the three-axis components of the wind speed currently encountered by the aircraft, and the wind speed distribution ahead of the aircraft, are measured simultaneously, by providing a Doppler anemometer which measures the airflow speeds at a plurality of points separated by a prescribed distance in the beam irradiation direction, and an inertial data measurement device which measures the movement information and positional information of the aircraft.

Furthermore, in the measurement system for an aircraft according to the present invention, the measurement accuracy of the device is improved by providing means for obtaining information relating to the attitude angles, the attitude angular velocities, and the ground speed of the aircraft during measurement, from the inertial data measurement device, and for correcting the measurement values from the Doppler anemometer by means of the information.

Moreover, in the measurement system for an aircraft according to the present invention, the measurement accuracy of the device is improved by providing means for obtaining positional information of the aircraft during measurement from the inertial data measurement device, and for correcting the measurement values from the Doppler anemometer by means of the information.

Furthermore, in the display system for an aircraft according to the present invention, the two-axis airspeed of the aircraft in a horizontal plane, the three-axis components of the wind speed currently encountered by the aircraft, and information on the wind speed distribution ahead of the aircraft, as obtained from the measurement system for an aircraft according to the present invention, are displayed simultaneously in real time.

Moreover, in the display system for an aircraft according to the present invention, the two-axis airspeed of the aircraft in a horizontal plane is displayed in the form of bars, which respectively indicate a fore/aft direction speed component and a left/right direction speed component, on two-dimensional coordinates in which the vertical axis represents the speed in the fore/aft direction and the horizontal axis represents the speed in the left/right direction, and furthermore, a speed restriction area is displayed as a rectangle on the two-dimensional coordinates.

Furthermore, in the display system for an aircraft according to the present invention, the three-axis components of the wind speed currently encountered by the aircraft are displayed by representing the wind speed information in the horizontal plane by numerical values as well as by the direction and thickness of an arrow, in terms of the wind direction and wind speed, and by representing the vertical wind speed information by numerical values as well as by a rectangular bar graph, in terms of the orientation in the vertical direction and the wind speed.

Moreover, in the display system for an aircraft according to the present invention, the wind speed distribution in the region ahead of the aircraft nose in which the beam is irradiated is displayed in a fan shape, separately for a horizontal plane and a vertical plane. Furthermore, the information on the wind speed distribution ahead of the aircraft is displayed by varying the color of the display continuously in accordance with the wind speed, using a blue color for a head wind component with respect to the aircraft, a green color for a windless state, and a red color for a tail wind component.

Since the measurement system of the aircraft according to the present invention comprises a Doppler anemometer which measures the airflow speeds at a plurality of points separated by a prescribed distance in the beam irradiation direction, and an inertial data measurement device which measures the movement information and positional information of the aircraft, and the beam irradiation direction of the Doppler anemometer is changed in a time series, then it is possible to measure a plurality of directional components of the wind speed at a plurality of points, from the vicinity of the aircraft towards a remote direction, ahead of the aircraft, in a short time period, and by carrying out geometrical conversion processing on the wind speed component information thus obtained, it is possible to measure the three-axis components of the airspeed of the aircraft, the three-axis components of the wind speed currently encountered by the aircraft, and the wind speed distribution ahead of the aircraft, simultaneously.

Moreover, since the measurement system for an aircraft according to the present invention comprises means for obtaining information relating to the attitude angles, the attitude angular velocities, and the ground speed of the aircraft during measurement, from the inertial data measurement device, and for correcting the measurement values from the Doppler anemometer by means of the information, then it is possible to correct error, even if cases where the aircraft performs unsteady movements, and it is also possible to improve the measurement accuracy of the device.

Furthermore, since the measurement system for an aircraft according to the present invention comprises means for obtaining positional information of the aircraft during measurement from the inertial data measurement device, and for correcting the measurement values from the Doppler anemometer by means of the information, it is possible to correct error, even in cases where the aircraft is moving at high speed, and hence the measurement accuracy of the device can be improved.

Moreover, since the display system for an aircraft according to the present invention displays the two-axis airspeed of the aircraft in a horizontal plane, the three-axis components of the wind speed currently encountered by the aircraft, and information on the wind speed distribution ahead of the aircraft, as measured by a Doppler anemometer, simultaneously in real time, then the measurement information can be recognized readily by the pilot, thus making a contribution to improvement in safety and task completion rates.

Furthermore, since the display system for an aircraft according to the present invention displays the two-axis airspeed of the aircraft in a horizontal plane in the form of bars, which respectively indicate the fore/aft direction speed component and the left/right direction speed component, on two-dimensional coordinates in which the vertical axis represents the speed in the fore/aft direction and the horizontal axis represents the speed in the left/right direction, then the current airspeed can be seen by the pilot at a glance, and furthermore, since a speed restriction area is displayed as a rectangle on the two-dimensional coordinates, then it is possible to prevent the aircraft from traveling at a speed exceeding these restrictions (in particular, in the lateral speed and rearward speed), thus making a contribution to improvement in safety and task completion rates.

Moreover, since the display system for an aircraft according to the present invention displays the three-axis components of the wind speed currently encountered by the aircraft by representing the wind speed information in the horizontal plane by numerical values as well as by the direction and thickness of an arrow, in terms of the wind direction and wind speed, and by representing the vertical wind speed information by numerical values as well as by a rectangular bar graph, in terms of the orientation in the vertical direction and the wind speed, then it is possible for the pilot readily to recognize the three-dimensional state of the wind currently encountered by the aircraft, thus assisting the pilot in performing suitable flight controls against wind turbulence, and hence contributing to improvement in safety and task completion rates.

Furthermore, since the display system for an aircraft according to the present invention displays the information on the wind speed distribution in the region ahead of the aircraft nose in which the beam is irradiated, by varying the color of the display continuously in accordance with the wind speed, using a blue color for a head wind component with respect to the aircraft, a green color for a windless state, and a red color for a tail wind component, and since it displays the wind speed distribution in the region ahead of the aircraft in a fan shape, separately for a horizontal plane and a vertical plane, then the state of the wind speed distribution ahead of the aircraft can be recognized readily, thus assisting the pilot in flying so as to avoid areas of strong wind turbulence, and hence contributing to improvement in safety and task completion rates.

BRIEF DESCRIPTION OF THE DRAWINGS

FIG. 7 is a graph showing the results of experimentation performed by installing an embodiment of the present invention in a test helicopter.

DESCRIPTION OF THE PREFERRED EMBODIMENTS

Figure 1:
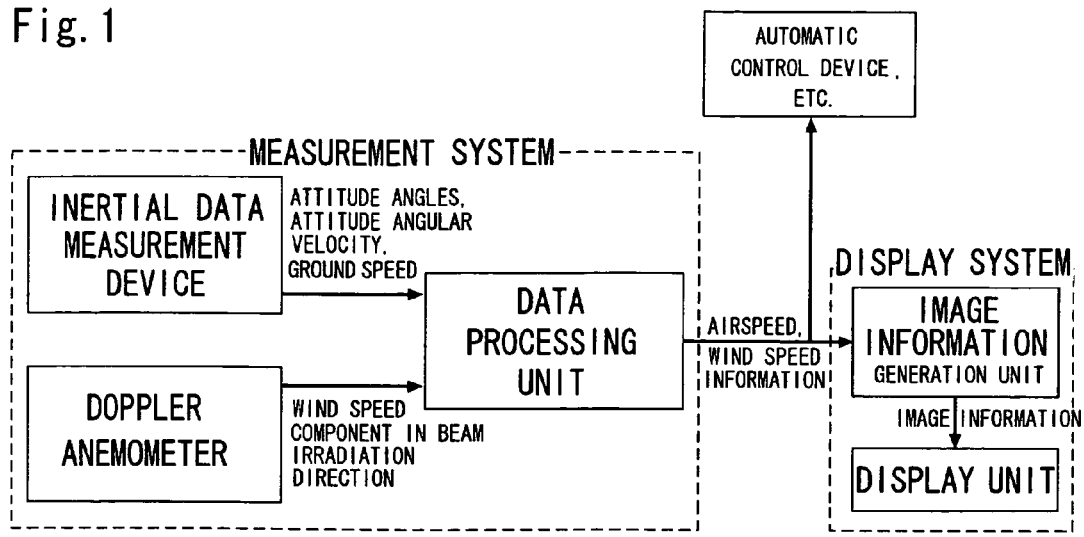
FIG. 1 is a block diagram showing the basic composition of an airspeed and wind speed measurement and display system for an aircraft according to the present invention.

The object of the present invention is to provide a system for an aircraft, such as a helicopter, capable of measuring the three-axis airspeed including the lateral speed and rearward speed, and measuring the wind speed information ahead of the aircraft, as well as providing a display system which displays the measured airspeed and wind speed information to the pilot, in a readily comprehensible fashion, and achieving highly accurate measurement by providing a compensation function for the movement of the aircraft during travel of the beam of the Doppler anemometer. As shown in FIG. 1, the basic composition for achieving this comprises a Doppler anemometer capable of measuring the component of the airflow speed in the beam irradiation direction, at a plurality of points mutually separated by a prescribed distance, an inertial data measurement device which measures the movement information and positional information of the aircraft, a data processing unit for calculating the airspeed of the aircraft and the wind speed ahead of the aircraft, and a display system which displays the measurement results. Moreover, in order to correct the error caused by unsteady movement or high-speed travel of the aircraft itself, means is provided for obtaining the movement and positional information of the aircraft during measurement such as the attitude angles, the attitude angular velocities, and the speed and position relative to the ground, from the inertial data measurement device, and using this information to correct the measurement value of the Doppler anemometer.

Figure 2:
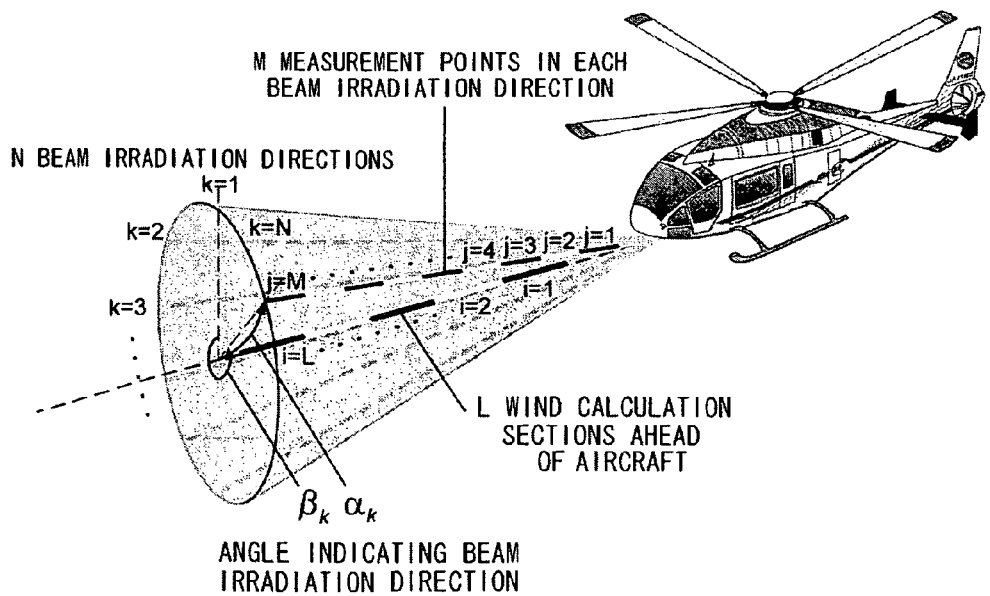
FIG. 2 is a diagram showing a conceptual view of beam scanning of a Doppler anemometer for an aircraft according to the present invention.

The Doppler anemometer according to the present invention, which performs measurement of the three-axis components of the airspeed of the aircraft and the wind speed ahead of the aircraft, simultaneously, must have characteristics which allow it to be fitted to the aircraft, and to measure the air flow speed at a plurality of points in front of the aircraft, from several ten meters to approximately one kilo meters. A radar anemometer, a lidar anemometer and a sodar anemometer may be considered as a Doppler anemometer, but below, an example is described in which a lidar anemometer, which has the greatest possibility of meeting the required characteristics, is used. The lidar anemometer is mounted on the aircraft, and by scanning a laser beam in the form of a conical plane in the forward direction from the aircraft, as shown in FIG. 2, then the three-axis component of the airspeed of the aircraft and the wind speed ahead of the aircraft can be measured simultaneously. This capacity for simultaneous measurement by the lidar anemometer only relates to the component in the beam irradiation direction (one axis) of the airspeed of the moving body, and therefore, in order to measure the three-axis airspeed of the moving body, the beam irradiation direction is changed in at least three different directions. In order to avoid the disturbance caused to the airflow by the aircraft itself, three-axis components for the airspeed of the aircraft and the wind speed currently encountered by the aircraft are calculated by using data from a measurement point several ten meters in front of the aircraft, assuming that there is no change in the wind speed between a measurement point several ten meters in front of the aircraft, and a point located on the aircraft. The wind speed ahead of the aircraft is acquired as a series of wind speed data at a plurality of measurement points from several ten meters to one kilo meters ahead in the beam irradiation direction, thereby making it possible to determine the spatial change of the wind speed (wind shear). The airspeed information and the wind speed information thus obtained are displayed to the pilot in the format described below, or the like. Furthermore, in an aircraft having an automatic control system, the information thus obtained is provided to the automatic control system by means of a suitable data link, and the airspeed and wind speed information can be used to control the aircraft.

In order to compensate for the movement of the aircraft during the scanning of the beam of the Doppler anemometer, in the present invention, the movement and positional information of the aircraft from the inertial data measurement device are used. When a Doppler anemometer is provided in an aircraft (moving body), it measures the sum of the speed of movement of the actual airflow (wind speed), plus the ground speed of movement of the moving body, in other words, the airspeed of movement of the moving body with respect to the atmosphere at the measurement point. In a conventional method, the airspeed is calculated on the assumption that the ground speed of the moving body does not change during beam scanning, and therefore, if the moving body performs unsteady movements and its ground speed changes during beam scanning, then there will be a large error in the airspeed measurement. Furthermore, in a conventional method, the airspeed is calculated on the assumption that the wind speed is constant within the beam scanning space, but when the moving body is moving at high speed, there is a large change in the position of the moving body during beam scanning, and the scanning space becomes large, thus increasing the possibility of a change in the wind speed within the scanning space, which is a potential cause of measurement error.

In the present invention, the movement of the aircraft during beam scanning is detected by using information relating to the attitude of the moving body, and the ground speed and ground position, as measured by the inertial measurement device, and error caused by this movement is corrected, thereby improving the measurement accuracy of the wind speed and the airspeed of the moving body. In a conventional method, the three-axis components of the airspeed are calculated from the airflow speed components in a plurality of beam irradiation directions, by means of a minimum-square method, or the like, based on the assumption that the airspeed of the moving body during beam scanning, and the wind speed within the scanning space, are constant. The wind speed is calculated by subtracting the calculated airspeed from the ground speed of the moving body. By contrast, in the present invention, by compensating for the movement of the moving body during beam scanning, the three-axis components of the wind speed are calculated directly. In other words, the component of the ground speed of the moving body in the beam irradiation direction is calculated from the information on the attitude of the moving body and the ground speed, and the component of the wind speed in the beam irradiation direction is calculated by subtracting the airflow speed, which is the measurement value from the Doppler anemometer, from this ground speed component of the moving body. Furthermore, even if the moving body happens to be moving at high speed, the position of the measurement point is calculated by taking account of the change in the position of the moving body, in such a manner that the scanning space does not become large, and hence only information relating to measurement points within a range where uniform wind speed can be assumed are used. By means of these compensational processes, a state is achieved which is similar to that of measuring wind with a fixed Doppler anemometer on the ground, and the three-axis components of the wind speed can be calculated by a minimum-square method, or the like, based on the assumption that the wind speed within the scanning space is uniform. The airspeed is calculated by subtracting the calculated wind speed from the ground speed. By compensating for the movement of the moving body, causes of error, such as unsteady movement of the moving body, or change in the position of the moving body during beam scanning, can be removed, and improved accuracy can be anticipated.

This method is not restricted to use with an aircraft and a lidar anemometer, and it can also be applied generally to measurement of the three-axis components of the airspeed of the moving body, by means of a Doppler anemometer which is only capable of measuring one axial component of the airspeed.

The attitude of the aircraft in the three axes (pitch, roll and yaw), and the three-axis components of the attitude angular velocity and the ground speed, are measured by means of the inertial data measurement device. Inertial data measurement devices are already used in practice, but due to their high price, they are not widely adopted in small aircraft, such as helicopters. However, in recent years, less expensive devices destined for small aircraft, which are based on micro electro mechanical systems (MEMS) technology, have been offered and have entered practical use. Furthermore, the position of aircraft can be measured to a high degree of accuracy by means of a GPS receiver. There are a large number of inexpensive GPS receiver devices on offer, which are designed for use in small aircraft.

In the data processing unit, the three-axis components of the airspeed of the aircraft, the wind currently encountered by the aircraft, and the wind speed ahead of the aircraft, are calculated from the measurement data from the Doppler anemometer and the inertial data measurement device. The three-axis components of the wind speed ahead of the aircraft are calculated for respective sections derived by dividing the distance direction in front of the aircraft into L sections (see FIG. 2). The distance from the aircraft to the respective calculation sections is expressed as RNGi. A more concrete description of the calculation procedure is given below.

(A) Definition of Suffixes

Since a plurality of airflow speed data (here, M sets of data) are obtained at intervals of several tens of meters in one beam irradiation direction, in the Doppler anemometer used in the present invention, then the data is differentiated by means of the suffix j. In other words, data having the same value of j is data that has been measured in the same uniform measurement range. Furthermore, in calculating the three-axis components, since data is required in at least three or more beam irradiation directions, it is supposed here that data in N irradiation directions is used, and this data is differentiated by means of the suffix k. In other words, data having the same value of k is data that has been measured in the same beam irradiation direction (see FIG. 2).

(B) Calculation of Measurement Position

The measurement positions $x_{jk}$, $y_{jk}$ and $z_{jk}$ of the airflow speed data $v_{jk}$ measured by the Doppler anemometer are given by Formula (1) below, in terms of an aircraft body-fixed coordinates system which takes the current position of the aircraft as the point of origin. The second term "$E(\Phi,\Theta,\Psi) r_k^{ned}$" in Formula (1) is a term which compensates for the movement of the aircraft during beam scanning. When the ground speed of movement of the moving body is slow, the positional information for the moving body is ignored, by omitting this term, thus decreasing the calculational processing load.

(Formula 1)

$$\begin{bmatrix} x_{jk} \\ y_{jk} \\ z_{jk} \end{bmatrix} = rng_j \begin{bmatrix} \cos\alpha_k \\ \sin\beta_k \sin\alpha_k \\ -\cos\beta_k \sin\alpha_k \end{bmatrix} + E(\Phi, \Theta, \Psi) r_k^{ned}, \quad (1)$$

$$E(\phi, \theta, \psi) = \begin{bmatrix} \cos\theta\cos\psi & \sin\phi\sin\theta\cos\psi - \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi - \sin\phi\cos\psi \\ -\sin\theta & \sin\phi\cos\theta & \cos\phi\cos\theta \end{bmatrix}$$

Here, $rng_j$ is the measurement range of the Doppler anemometer, $\alpha_k$ and $\beta_k$ are angles indicating the beam irradiation direction expressed in terms of a coordinates system fixed at the Doppler anemometer, $\Phi$, $\Theta$ and $\Psi$ are the current attitude angles of the aircraft, and $r_k^{ned}$ is the position of the aircraft when irradiating a beam in the kth direction (a relative position with respect to the current position, being an output based on a NED (north-east-down) coordinates system). The element, $r^{ned}_k$, is calculated by Formula (2), from the aircraft position measured by the inertial data measurement device (output based on WGS-84 coordinates system).

(Formula 2)

$$r^{ned}_k = \begin{bmatrix} -\sin\eta\cos\lambda & -\sin\eta\sin\lambda & \cos\eta \\ -\sin\lambda & \cos\lambda & 0 \\ -\cos\eta\cos\lambda & -\cos\eta\sin\lambda & -\sin\eta \end{bmatrix} (r^{wgs}_k - r^{wgs})$$

Here, $\eta$ and $\lambda$ indicate the current aircraft position (latitude and longitude outputs based on WGS-84 coordinates system), $r^{wgs}$ indicates the current aircraft position (perpendicular coordinates output based on WGS-84 coordinates system), and $r^{wgs}_k$ indicates the position of the aircraft when irradiating a beam in the kth direction (perpendicular coordinates output based on WGS-84 coordinates system).

(C) Calculation of Wind Speed

The space in which a uniform wind can be assumed is defined with respect to the sections for which the wind speed is calculated, and only those measurement points which are contained in this space are used for calculating the wind speed. For example, if it is assumed that the wind is constant within a spherical space having a radius of Ri centered on each section, then the conditions for selecting the measurement points are expressed by Formula (3). Here, desirably, the value of $R_i$ is approximately equal to or less than the length of the wind speed calculation section, in other words, the interval $RNG_i$. Below, the combined suffixes j, k of the measurement points selected in each section are shown as jk(i).

(Formula 3)

$$(x_{jk} - RNG_i)^2 + y_{jk}^2 + z_{jk}^2 < R_i^2 \quad (3)$$

By applying a minimum-square method as defined in Formula (4), to the airflow speed data $v_{jk}$ measured by the Doppler anemometer, the three-axis components of the wind speed in an earth-fixed coordinates system, namely, $Wx_i$, $Wy_i$ and $Wz_i$, are calculated for each of the respective wind speed calculation sections.

(Formula 4)

$$\frac{\partial f_i}{\partial Wx_i} = \frac{\partial f_i}{\partial Wy_i} = \frac{\partial f_i}{\partial Wz_i} = 0, \quad (4)$$

$$f_i = \sum_{jk(i)} \left\{ \begin{array}{l} Wx_i \cos\theta_k \cos\psi_k + Wy_i \cos\theta_k \sin\psi_k \\ - Wz_i \sin\theta_k - (VgLOSx^o_k - v_{jk}) \end{array} \right\}$$

Here, the terms, $\theta_k$ and $\psi_k$ in Formula (4) are angles that indicate the beam irradiation direction as expressed in an earth-fixed coordinates system, and they are derived from Formula (5), on the basis of the angles $\alpha_k$ and $\beta_k$ indicating the beam irradiation direction expressed in a coordinates system fixed at the Doppler anemometer, the attitude angles of the aircraft, $\Phi_k$, $\Theta_k$ and $\Psi_k$, and the installation angles $\Phi_R$, $\Theta_R$ and $\Psi_R$, of the lidar anemometer.

(Formula 5)

$$\theta_k = \sin^{-1} Lz_k, \quad \psi_k = \tan^{-1}(Lx_k / Ly_k), \quad (5)$$

$$\begin{bmatrix} Lx_k \\ Ly_k \\ Lz_k \end{bmatrix} = E(\Phi_k, \Theta_k, \Psi_k) E(\Phi_R, \Theta_R, \Psi_R) \begin{bmatrix} \cos\alpha_k \\ \sin\beta_k \sin\alpha_k \\ -\cos\beta_k \sin\alpha_k \end{bmatrix}$$

Furthermore, the term $VgLOSx^o_k$ in Formula (4) is the beam irradiation direction component of the ground speed of the aircraft at the installation position of the lidar anemometer. Assuming that the aircraft is a rigid body, then this term can be derived by Formula (6), on the basis of the three-axis components of the ground speed of the aircraft at the installation position of the inertial data measurement device, $VgBx^m_k$, $VgBy^m_k$, $VgBz^m_k$, the three-axis components of the attitude angular velocity $P_k$, $Q_k$, $R_k$, and the three-axis components of the positional vector from the installation position of the inertial data measurement device to the installation position of the lidar anemometer, rx, ry, rz. These variables are all expressed in aircraft body-fixed coordinates system.

(Formula 6)

$$\begin{bmatrix} VgLOSx^o_k \\ VgLOSy^o_k \\ VgLOSz^o_k \end{bmatrix} = E^{-1}(0, \theta_k, \psi_k) \begin{bmatrix} VgEx^o_k \\ VgEy^o_k \\ VgEz^o_k \end{bmatrix}, \quad (6)$$

$$\begin{bmatrix} VgEx^o_k \\ VgEy^o_k \\ VgEz^o_k \end{bmatrix} = E(\Phi_k, \Theta_k, \Psi_k) \left( \begin{bmatrix} VgBx^m_k \\ VgBy^m_k \\ VgBz^m_k \end{bmatrix} + \begin{bmatrix} P_k \\ Q_k \\ R_k \end{bmatrix} \times \begin{bmatrix} rx \\ ry \\ rz \end{bmatrix} \right)$$

The wind currently encountered by the aircraft is expressed by $Wx_1$, $Wy_1$, $Wz_1$, for i=1, which is the wind speed calculation section that is nearest to the aircraft.

(D) Calculation of Airspeed of Aircraft

The three-axis components of the airspeed of the aircraft at the installation position of the inertial data measurement device, $VaBx^m_k$, $VaBy^m_k$, $VaBz^m_k$, expressed in aircraft body-fixed coordinates system, are derived by Formula (7), by using $Wx_1$, $Wy_1$ and $Wz_1$.

(Formula 7)

$$\begin{bmatrix} VaBx_k \\ VaBy_k \\ VaBz_k \end{bmatrix} = \begin{bmatrix} VgBx^m_k \\ VgBy^m_k \\ VgBz^m_k \end{bmatrix} - E^{-1}(\Phi_k, \Theta_k, \Psi_k) \begin{bmatrix} Wx_1 \\ Wy_1 \\ Wz_1 \end{bmatrix} \quad (7)$$

The airspeed and wind speed information calculated by the aforementioned procedures is sent to a display unit by means of a suitable data link device. Furthermore, in an aircraft having an automatic control system, the airspeed and wind speed information is sent to the automatic control system, where it can be used to control the aircraft.

Figure 3:
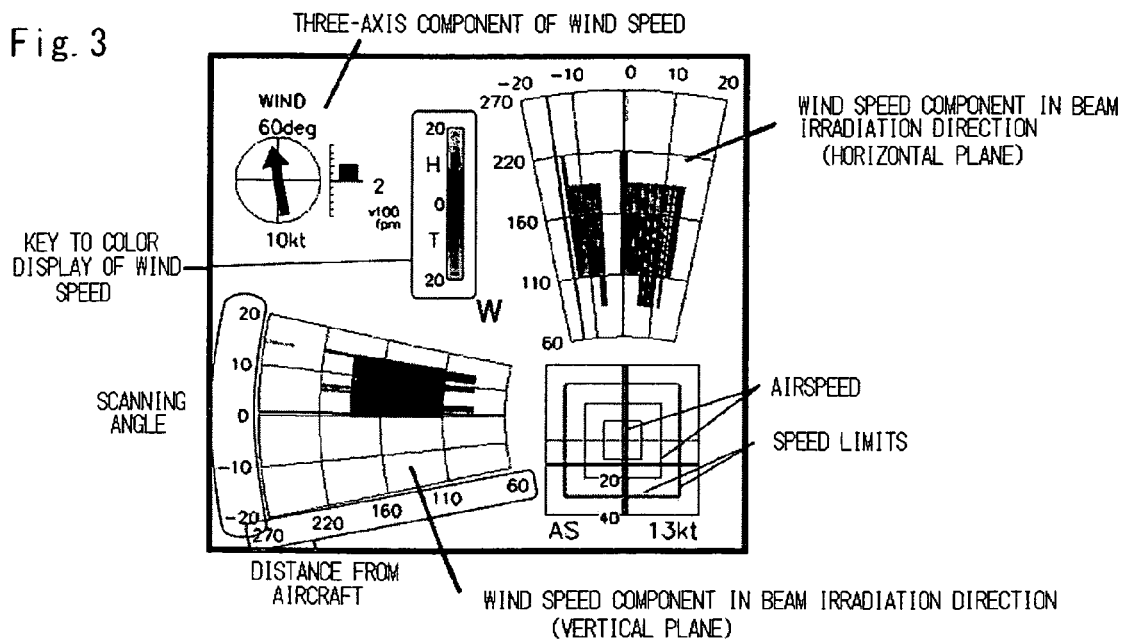
FIG. 3 is a diagram showing a display format of an airspeed and wind speed display system according to the present invention.

As well as performing highly accurate measurement, another important element of the present invention is to display the information in a format that is easy for the pilot to recognize. In the display system, the airspeed and wind speed information calculated by the data processing unit is acquired, image information is generated in accordance with the display format, and this image is displayed to the pilot. FIG. 3 shows an example of a display format. A display section forming an airspeed meter is situated in a bottom right position, a display section for the three-axis components of the wind speed currently encountered by the aircraft is situated in a top left position, and a display of the wind speed distribution ahead of the aircraft is situated in a central position.

The airspeed meter displays bars which respectively indicate the speed component in the fore/aft direction and the speed component in the left/right direction, on a two-dimensional coordinates system in which the vertical axis represents the speed in fore/aft direction, and the horizontal axis represents the speed in left/right direction. At the same time, on the background of the two-dimensional ordinates system, the speed limits for the lateral speed and the rearward speed are indicated by a red rectangular shape, in order to attract the attention of the pilot.

The three-axis components of the wind speed currently encountered by the aircraft are displayed separately as a wind speed in the horizontal plane and a wind speed in the vertical direction. The information on the wind speed in the horizontal plane is represented by numerical values as well by the direction and thickness of an arrow, in terms of the wind direction and the wind speed. The information on the vertical wind speed is represented by numerical values as well as a rectangular bar graph, in terms of the orientation in the vertical direction and the wind speed. In this way, the three-axis components of the wind speed are displayed.

The wind speed distribution ahead of the aircraft displays only the wind speed component in the beam irradiation direction, in other words, approximately the direction in which the nose of the aircraft is pointing (the item "VgLOSx$°_k$–v$_{jk}$" in Formula (4)), in separate fan shapes relating to the horizontal plane and the vertical plane. The wind speed is shown by varying the colors of the measurement points distributed within the fan shape. A blue color is used to indicate a head wind component with respect to the aircraft, a green color, to indicate a windless state, and a red color, to indicate a tail wind component, and hence the colors are changed continuously in accordance with the wind speed. In general, a head wind increases the airspeed of the aircraft, and therefore it is displayed in blue since it has the effect of increasing the lift that raises the aircraft, whereas a tail wind reduces the airspeed, and therefore it is displayed in red since it has the effect of reducing the lift, and hence caution is required. The three-axis wind components is not displayed because they may include the errors which arise due to failure to collect enough measurement points within a space where a uniform wind can be assumed, at the wind calculation sections far from the aircraft, since as the measurement points are farther from the aircraft, the beam scanning space becomes larger.

First Embodiment

Figure 4:
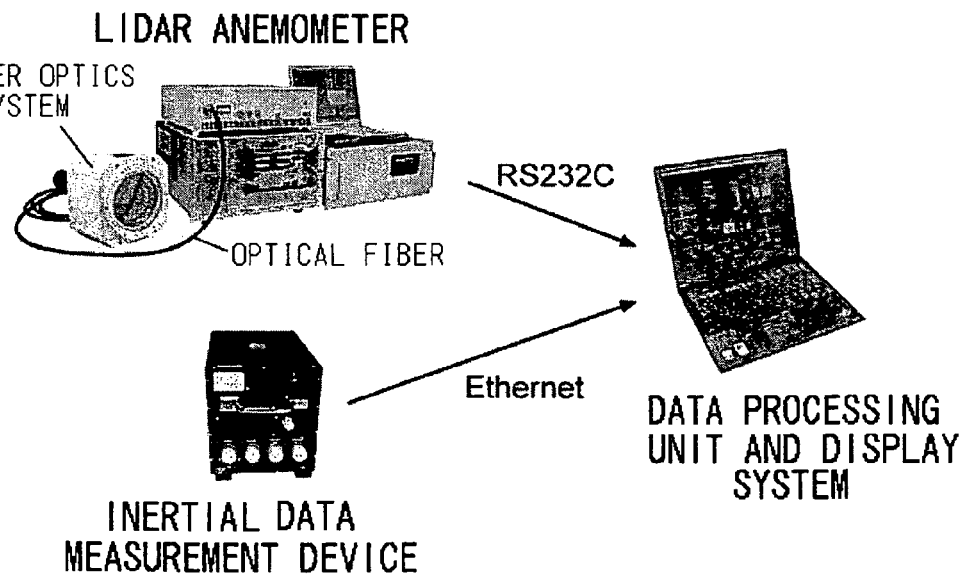
FIG. 4 is a diagram illustrating the composition of an embodiment of the present invention.
Figure 5:
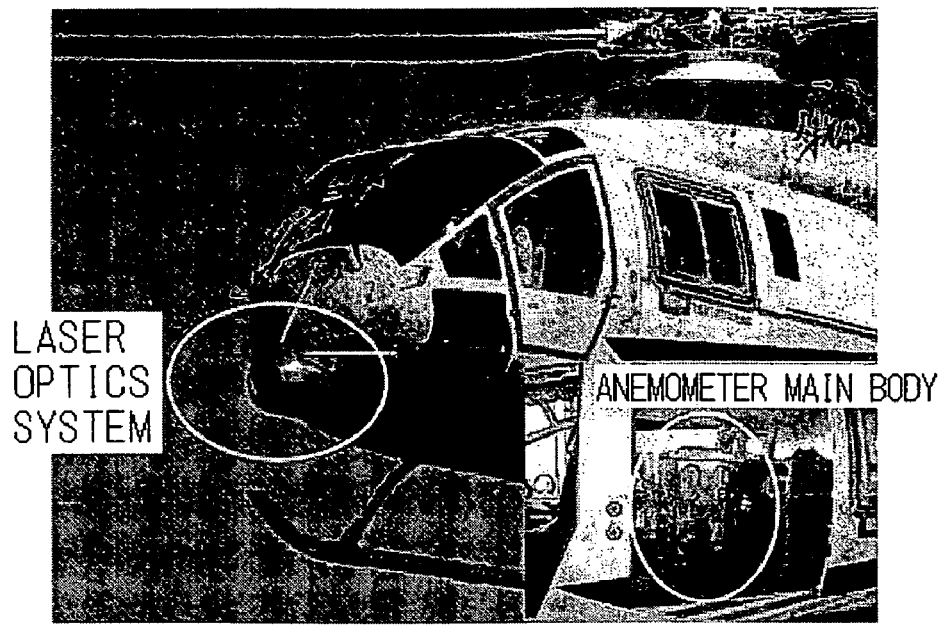
FIG. 5 is a diagram illustrating a mode of the installation of a Doppler anemometer in a test helicopter, according to an embodiment of the present invention.
Figure 6:
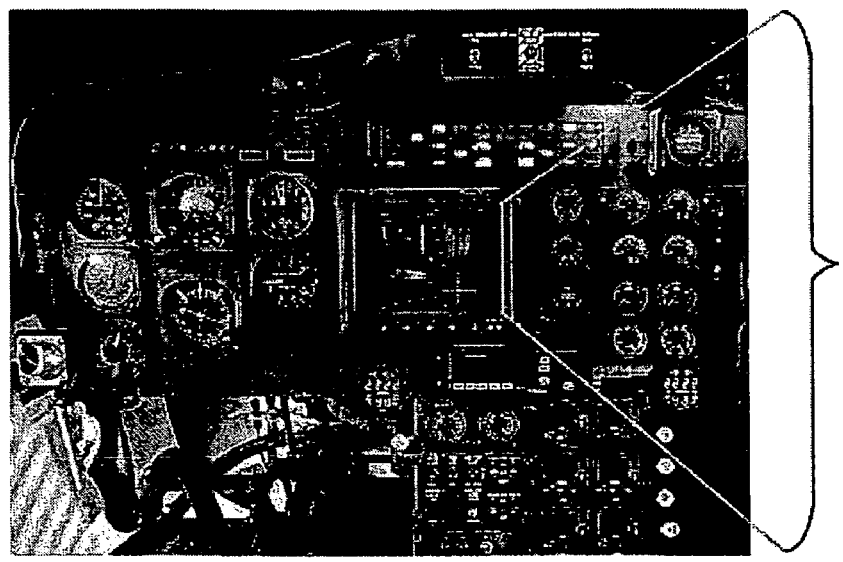
FIG. 6 is a diagram illustrating a mode of the installation of a display system in a test helicopter according to a further embodiment of the present invention.

FIG. 4 shows an example of a trial manufacture of the present device. In order to facilitate the installation of the lidar anemometer on the aircraft, the laser optics system which needs to be fitted outside the aircraft is formed as a separate unit, and this optics system is connected to the main body of the anemometer by means of optical fibers. The inertial data measurement device comprises a three-axis gyro and accelerometer, and it is capable of measuring the attitude angles, attitude angular velocities and ground speed, which are required in order to compensate for the movement of the aircraft. The algorithms of the data processing unit and the image information generating unit are installed in a notebook computer. However, since the present embodiment relates to a helicopter which has a slow speed of movement, then the information on the position of the aircraft is not used in the compensation procedure (namely, the element "E($\Phi,\Theta,\Psi$) $r^{ned}_k$" in Formula (1) is set to zero). The measurement data from the lidar anemometer and the inertial data measurement device is sent to the notebook computer via an RS232C connection, and Ethernet, respectively. This device was installed in a test helicopter belonging to the present applicants, and the accuracy of the airspeed and wind speed calculations performed by the device were evaluated, as well as pilot-testing the display format, in an actual flight situation. As shown in FIG. 5, the laser optics system of the lidar anemometer was installed on the lower surface of the nose of the aircraft, and the main body of the anemometer was installed inside the cabin. During operation of the device, laser light was scanned in a conical shape in a forward direction from the helicopter, as shown in FIG. 2. The inertial data measurement device and the notebook computer were installed inside the cabin. The display unit used an experimental display located on the instrumental panel in a cockpit, as shown in FIG. 6, and displayed image information in the display format shown in FIG. 3.

FIG. 7 shows an example of the calculation of airspeed when the helicopter is traveling forwards or rearwards. The uppermost graph shows the fore/aft speed, the second graph shows the lateral speed, the third graph shows the vertical speed, and the bottommost graph shows the orientation of the aircraft nose. In the graphs, a broken line indicates a reference airspeed (calculated from the airspeed of the helicopter and the wind speed measured by a ground-based anemometer), a dotted line indicates the airspeed as calculated by means of a conventional method, and a solid line indicates the airspeed as calculated by means of the method provided by the present invention. Whereas the conventional method is not able to follow the movements of the helicopter, in the case of the method provided by the present invention, the airspeed is calculated correctly, thus demonstrating the outstanding characteristics of the present invention in compensating for the movement of the aircraft during beam scanning. Furthermore, in the pilot-testing of the display format, the effectiveness of the two or three-axis component display of airspeed and wind speed was confirmed by comments from the pilot, such as "I can see the state of the wind during hovering, so that improves safety", or "It even shows the airspeed when traveling at low speeds where the airspeed could not be measured in the past, and this makes it much easier to stay within the speed restrictions".

With regard to the industrial usability of the present invention, it can be seen that the present device is highly practical in the case of emergency rescue helicopters where all-weather flight capability is a key requirement, and that it can contribute towards improving safety, and rescue task completion rates. For example, when carrying out a rescue task in a mountainous area subject to strong winds, the wind conditions at the rescue point can be confirmed by means of the present device, areas having weaker turbulence can be identified, and a flight course to the rescue point can be chosen accordingly. Furthermore, when hovering in a stationary fashion over the rescue point, by-means of the present device, it is possible to confirm that the helicopter is not exceeding the lateral speed or fore/aft speed restrictions (during stationary hovering, the lateral speed is equivalent to the lateral wind speed, and the rearward speed is equivalent to the tail wind speed), and if necessary, safety can be ensured by taking countermeasures, such as changing the orientation of the aircraft nose to the windward direction. Furthermore, if progress is made in reducing the size and weight of the device, and lowering costs, then it is envisaged that the present device could contribute to improving safety and transportation performance, by being fitted in small aircraft and helicopters which perform commuter services. In particular, the present device can be regarded as valuable when applied to transportation services between remote islands or offshore oil rigs, where wind conditions can be especially severe.

What is claimed is:

1. A measurement system for an aircraft, comprising:
   a Doppler anemometer for simultaneously measuring airflow speeds in plural points of a beam irradiation direction at the same time;

an inertial data measurement device which measures the movement information and positional information of the aircraft, and said Doppler anemometer provides means to measure the three-axis components of the airspeed of the aircraft, the three-axis components of the wind speed currently encountered by the aircraft, and the wind speed distribution ahead of the aircraft at the same time, by changing the beam irradiation direction of the Doppler anemometer in a time series, wherein the measurement accuracy of the device is improved by providing means for obtaining information relating to the attitude angles, the attitude angular velocities, and the ground speed of the aircraft during measurement, from the inertial data measurement device, and for correcting the measurement values from the Doppler anemometer with said information.

2. The measurement system for an aircraft according to claim 1, wherein the measurement accuracy of the device is improved, by providing means for obtaining positional information of the aircraft during measurement from the inertial data measurement device, and for correcting the measurement values from the Doppler anemometer with said information.

3. A display system for an aircraft, wherein the two-axis airspeed of the aircraft in a horizontal plane, the three-axis components of the wind speed currently encountered by the aircraft, and information on the wind speed distribution ahead of the aircraft, as obtained from the measurement system for an aircraft according to claim 2 are displayed simultaneously in real time.

4. The display system for an aircraft according to claim 3, wherein the two-axis airspeed of the aircraft in a horizontal plane is displayed in the form of bars, which respectively indicate a fore/aft direction speed component and a left/right direction speed component, on two-dimensional coordinates in which the vertical axis represents the speed in the fore/aft direction and the horizontal axis represents the speed in the left/right direction, and furthermore, a speed restriction area is displayed as a rectangle on the two-dimensional coordinates.

5. The display system for an aircraft according to claim 3, wherein the three-axis components of the wind speed currently encountered by the aircraft are displayed by representing the wind speed information in the horizontal plane by numerical values as well as by the direction and thickness of an arrow, in terms of the wind direction and wind speed, and by representing the vertical wind speed information by numerical values as well as by a rectangular bar graph, in terms of the orientation in the vertical direction and the wind speed.

6. The display system for an aircraft according to claim 3, wherein the wind speed distribution in the region ahead of the aircraft nose in which the beam is irradiated is displayed in a fan shape, separately for a horizontal plane and a vertical plane.

7. The display system for an aircraft according to claim 6, wherein the information on the wind speed distribution ahead of the aircraft is displayed by varying the color of the display continuously in accordance with the wind speed, using a blue color for a head wind component with respect to the aircraft, a green color for a windless state, and a red color for a tail wind component.

8. A display system for an aircraft, wherein the two-axis airspeed of the aircraft in a horizontal plane, the three-axis components of the wind speed currently encountered by the aircraft, and information on the wind speed distribution ahead of the aircraft, as obtained from the measurement system for an aircraft according to claim 1 are displayed simultaneously in real time.

9. The display system for an aircraft according to claim 8, wherein the two-axis airspeed of the aircraft in a horizontal plane is displayed in the form of bars, which respectively indicate a fore/aft direction speed component and a left/right direction speed component, on two-dimensional coordinates in which the vertical axis represents the speed in the fore/aft direction and the horizontal axis represents the speed in the left/right direction, and furthermore, a speed restriction area is displayed as a rectangle on the two-dimensional coordinates.

10. The display system for an aircraft according to claim 8, wherein the three-axis components of the wind speed currently encountered by the aircraft are displayed by representing the wind speed information in the horizontal plane by numerical values as well as by the direction and thickness of an arrow, in terms of the wind direction and wind speed, and by representing the vertical wind speed information by numerical values as well as by a rectangular bar graph, in terms of the orientation in the vertical direction and the wind speed.

11. The display system for an aircraft according to claim 8, wherein the wind speed distribution in the region ahead of the aircraft nose in which the beam is irradiated is displayed in a fan shape, separately for a horizontal plane and a vertical plane.

12. The display system for an aircraft according to claim 11, wherein the information on the wind speed distribution ahead of the aircraft is displayed by varying the color of the display continuously in accordance with the wind speed, using a blue color for a head wind component with respect to the aircraft, a green color for a windless state, and a red color for a tail wind component.

* * * * *